(12) United States Patent
Alumbaugh et al.

(10) Patent No.: US 8,947,093 B2
(45) Date of Patent: Feb. 3, 2015

(54) ELECTROMAGNETIC SURVEY USING NATURALLY OCCURRING ELECTROMAGNETIC FIELDS AS A SOURCE

(75) Inventors: David Alumbaugh, Berkeley, CA (US); Edward Nichols, Clamart (FR); Nestor Cuevas, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1029 days.

(21) Appl. No.: 12/645,965

(22) Filed: Dec. 23, 2009

(65) Prior Publication Data
US 2011/0001482 A1    Jan. 6, 2011

Related U.S. Application Data

(60) Provisional application No. 61/160,100, filed on Mar. 13, 2009.

(51) Int. Cl.
*G01V 3/08* (2006.01)

(52) U.S. Cl.
CPC ..................................... *G01V 3/088* (2013.01)
USPC ...................................................... 324/344

(58) Field of Classification Search
None
See application file for complete search history.

(56) References Cited

U.S. PATENT DOCUMENTS

| | | | |
|---|---|---|---|
| 3,398,356 A | 8/1968 | Still | |
| 3,524,162 A * | 8/1970 | Zill | 367/30 |
| 4,349,781 A | 9/1982 | Vozoff | |
| 5,253,217 A * | 10/1993 | Justice et al. | 367/46 |
| 5,260,660 A | 11/1993 | Stolarczyk | |
| 5,614,670 A * | 3/1997 | Nazarian et al. | 73/146 |
| 5,869,968 A | 2/1999 | Brooks et al. | |
| 7,330,790 B2 * | 2/2008 | Berg | 702/13 |
| 7,550,969 B2 * | 6/2009 | Zhdanov | 324/243 |

(Continued)

FOREIGN PATENT DOCUMENTS

| | | |
|---|---|---|
| WO | WO2005085909 | 9/2005 |
| WO | 2008070200 A1 | 6/2008 |

OTHER PUBLICATIONS

Slankis, J.A. et al., 8 Hz Telluric and Magnetotelluric Prospecting, Geophysics, 37, 862-878, Oct. 1972.

(Continued)

*Primary Examiner* — Paresh Patel
(74) *Attorney, Agent, or Firm* — Cathy Hewitt

(57) ABSTRACT

Methods and related systems are described for measuring naturally occurring electromagnetic fields both at the earth's surface as well as downhole. These fields originate from currents in the ionosphere above the earth, and are the same fields as employed by known magnetotelluric geophysical methods based on surface measurements. Some embodiments are especially useful in horizontal wells that are uncased at depth, although some embodiments are also useful in normal vertical wells that are both uncased or cased with a conductive liner. The method includes receiving downhole electromagnetic survey data of the naturally occurring electromagnetic fields obtained using a downhole receiver deployed at a first location in a borehole. A second set of electromagnetic survey data of the naturally occurring electromagnetic fields is also received that has been obtained using a receiver deployed at a second location. A transfer function is estimated between the first and second locations for portions of the electromagnetic fields based on the two sets of electromagnetic survey data.

35 Claims, 14 Drawing Sheets

(56) References Cited

U.S. PATENT DOCUMENTS 7,969,152 B2 * 6/2011 Velikhov et al. ............ 324/335
2003/0087634 A1 * 5/2003 Raghavan et al. ............ 455/423

OTHER PUBLICATIONS

Park, S.K. et al., Monitoring Resistivity Change in Parkfield, California: 1988-1995, J. Geophys. Res., 102, 24545-24559.

Bevc, et al., "Borehole-to-surface electrical resistivity monitoring of a salt water injection experiment", Geophysics, vol. 56 (6), 1991, pp. 769-777.

Dyck, A.V., "Drill-Hole Electromagnetic Methods, Electromagnetic Methods in Applied Geophysics Applications—Part B", Society of Exploration Geophysicists, vol. 2, Chapter 11, 1991, pp. 881-931.

Egbert, et al., "Robust estimation of geomagnetic transfer functions", Geophys. J. R. Astr. Soc., vol. 87, 1986, pp. 173-194.

Egbert, Gary D., "Robust multiple-station magnetotelluric data processing", Geophys. J. Int., vol. 130, 1997, pp. 475-496.

Jones, Alan G., "A Passive Natural-Source Twin-Purpose Borehole Technique: Vertical Gradient Magnetometry", J. Geomag. Geoelectr., vol. 35, 1983, pp. 473-490.

Larsen, et al., "Robust smooth magnetotelluric transfer functions", Geophys. J. Int., vol. 124, 1996, pp. 801-819.

Latorraca, et al., "An analysis of the magnetotelluric impedance for three-dimensional conductivity structures", Geophysics, vol. 51, 1986, pp. 1819-1829.

Scholl, et al., "Marine downhole to seafloor dipole-dipole electromagnetic methods and the resolution of resistive targets", Geophysics, vol. 72, 2007, WA39-WA49.

Spitzer, K., "Observations of geomagnetic pulsations and variations with a new borehole magnetometer down to depths of 300m", Geophys. J. Int., vol. 115, 1993, pp. 839-848.

Tseng, et al., "A borehole-to-surface electromagnetic survey", Geophysics, vol. 63, 1998, pp. 1565-1572.

Vozoff, K., "Chapter 8: The Magnetotelluric Method", In Electromagnetic Methods in Applied Geophysics, vol. 2, Application; M.N. Nabighiaain, Ed., Society of Exploration Geophysicists, 1991, pp. 641-711.

Zonge, et al., "Chapter 9: Controlled source audio-frequency magnetotellurics", Electromagnetic Methods in Applied Geophysics, vol. 2, Application: M.N. Nabighain, Ed. Society of Exploration Geophysicists, 1991, pp. 713-809.

International Search Report issued in PCT/US2010/026760 on Jul. 11, 2011, 3 pages.

\* cited by examiner

ELECTROMAGNETIC SURVEY USING NATURALLY OCCURRING ELECTROMAGNETIC FIELDS AS A SOURCE

CROSS REFERENCE TO RELATED APPLICATION

This patent application claims benefit of U.S. Provisional Patent Application Ser. No. 61/160,100, filed 13 Mar. 2009, which is incorporated by reference herein.

BACKGROUND

1. Field

This patent specification relates to analyzing survey data from naturally occurring electromagnetic fields. More particularly, this patent specification relates to methods and systems for analyzing survey data from naturally occurring electromagnetic fields obtained using at least one borehole-deployed receiver.

2. Background

The use of surface to borehole electromagnetic methods has a long history in the mining industry. In general the technique uses a man-made source at the surface of the earth, with measurements made of various electromagnetic field components down-hole. Compared to surface only methods, surface-to-borehole techniques offer improved resolution at depth in the region of the borehole. Dyck, A, 1991, Drill-Hole, Electromagnetic methods p 881-931, in Electromagnetic methods in Applied geophysics edited by M. N. Nabighian, discusses a comprehensive history (mostly for mineral exploration) up until 1991. The use of a purely galvanic-electrical measurement configuration for monitoring saline water injection into an aquifer is provided in Bevc, D. and Morrison, H. F., 1991, Borehole-to-surface electrical resistivity monitoring of a salt-water injection experiment; Geophysics, 56, 769-777. Tseng, H.-W., Becker, A., Wilt, M. J., and Deszcz-Pan, M., 1998, A borehole-to-surface electromagnetic survey; Geophysics, 63, 1565-1572, documents the use of a down-hole magnetic-inductive source with measurements of the magnetic field made on the earth's surface to monitor the same injection process. Spitzer, K, 1983, Observations of geomagnetic pulsations and variations with a new borehole magnetometer down to depths of 300 m; Geophys. J. Int., 115, 839-848, and Jones, A. G., 1983, A passive, natural-source, twin-purpose borehole technique: vertical gradient magnetometry; J. of Geomag. and Geoelect., 35, 473-490, discuss methods with which to measure the magnetotelluric fields down hole. More recently, Scholl, C., and Edwards, R. N., 2007, Marine downhole to seafloor dipole-dipole electromagnetic methods and the resolution of resistive targets; Geophysics, 72, WA39-WA49, discusses a theoretical modeling study to propose using a downhole vertical electric transmitter with measurements of the electromagnetic field made at the seafloor for oil-reservoir exploration and characterization in a marine environment.

Generating a signal at the surface that can be detected downhole can be problematic from a logistics standpoint. If a large loop source is used on the earth's surface, a high enough frequency must be employed such that inductive scattering in the region around the borehole is significant enough to be detected. This can limit the depth to which the method can be employed due to attenuation losses at higher frequencies. A grounded source can be employed at any frequency. However, this requires making good electrical contact (that is, low contact resistance) with the ground, which again can cause problems logistically. In addition, both of these source configurations require the use of a high-power transmitter, which can be problematic to transport in difficult terrain.

WO 2005/085909 discusses making electromagnetic measurements on the surface and also measurements by a sensor in proximity to a reservoir in a wellbore. Initial measurements are used to construct an initial Earth model, and then repeat measurements made at different times during reservoir production to determine the spatial distribution of the fluid contact. The surface measurements can be magnetotelluric measurements. However, there is no discussion of downhole magnetotelluric measurements.

U.S. Pat. No. 4,349,781 discusses a method for measuring the natural fields downhole using a superconducting magnetic field measurement device. However, there is no discussion of using other types of downhole measurement devices and there is no discussion of combining the superconducting magnetic field measurements made downhole with surface magnetotelluric measurements.

SUMMARY

According to some embodiments, a method of analyzing survey data of electromagnetic fields originating from at or above the earth's surface provided. The electromagnetic fields can be naturally occurring or man-made. The method includes receiving downhole electromagnetic survey data of the electromagnetic fields obtained using a downhole receiver deployed at a first location in a borehole. A second set of electromagnetic survey data of the electromagnetic fields is also received that has been obtained using a receiver deployed at a second location. A transfer function is estimated between the first and second locations for at least portions of the electromagnetic fields based on at least portions of the two sets of electromagnetic survey data. The two sets of electromagnetic survey data are preferably simultaneously recorded. The transfer function is preferably estimated at one or more predetermined frequencies. The first and second locations are preferably spaced apart by at least 100 meters, and the survey data is primarily at frequencies of less than 10 kHz and preferably less than 1 kHz. The second location can be on the surface (either land or on a sea-bed), in the same borehole as the first location, or in a separate borehole.

According to some embodiments, a system for analyzing survey data of electromagnetic fields originating from above the earth's surface is also provided.

As used herein the term "transfer function" refers to a mathematical representation, in terms of spatial and/or temporal frequency, of the relation between and input and output of a system. For magnetotellurics, a common transfer function is the impedance transfer function written as $$\begin{bmatrix} Ex \\ Ey \end{bmatrix} = \begin{bmatrix} Zxx & Zxy \\ Zyx & Zyy \end{bmatrix} \begin{bmatrix} Hx \\ Hy \end{bmatrix}$$

(see, e.g. Vozoff, K., 1991, The magnetotelluric method, In Electromagnetic Methods in Applied Geophysics, Volume 2, Application; M. N. Nabighian, Ed., Society of Exploration Geophysicists, (hereinafter referred to at "Vozoff 1991") which is incorporated herein by reference. As used herein the term "transfer function" also refers to simple ratios between two sets of measurements that are both system outputs.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

Figure 1:
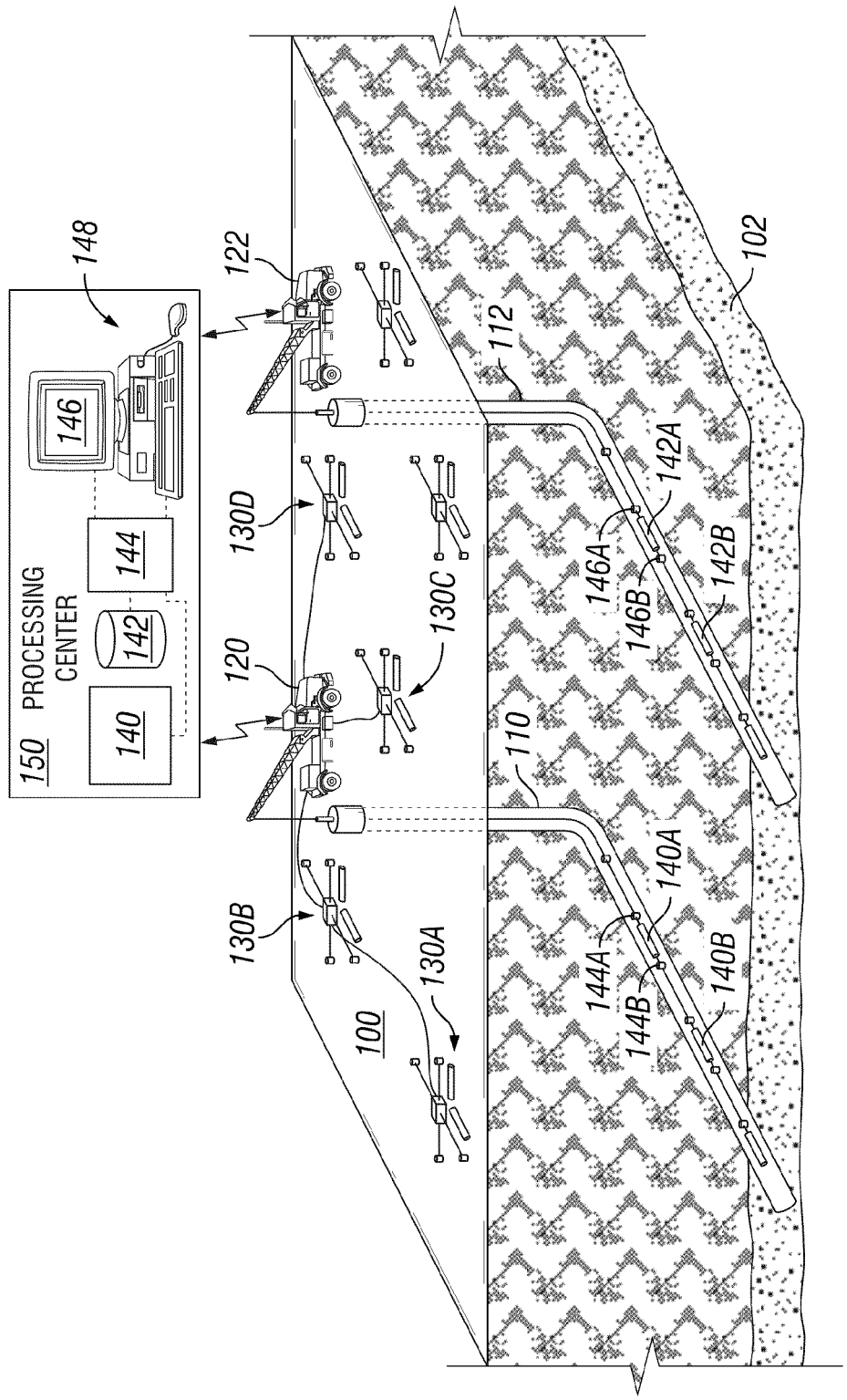
FIG. 1 illustrates a layout for natural field electromagnetic (EM) measurements made in horizontal wells within or in proximity to a reservoir as well as on the surface of the earth, according to some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

According to some embodiments, methods are described for measuring naturally occurring electromagnetic fields both at the earth's surface as well as down hole. These fields originate from currents in the ionosphere above the earth's surface, and are the same fields as employed by magnetotelluric geophysical method, which is generally a surface-only, or sea-floor-only geophysical exploration technique. Some embodiments are especially useful in horizontal wells that are uncased or cased with a conductive liner at depth, although some embodiments are also useful in normal vertical wells that are both uncased or cased with a conductive liner. When a conductive liner is present, the response due to casing properties should be characterized to recover the response of the sensor in uncased wells.

According to some embodiments, natural electric fields are simultaneously measured in a borehole and at the surface. The measurements of those fields are processed in order to produce transfer-function estimates between the borehole and surface measured fields. These borehole-to-surface transfer function estimates have been found to be more sensitive to changes at depth than measurements made at the same horizontal positions on the surface by themselves.

FIG. 1 illustrates a layout for natural field electromagnetic (EM) measurements made in horizontal wells within or in proximity to a reservoir as well as on the surface of the earth, according to some embodiments. In FIG. 1, electric field and/or magnetic field measurements are made in wells 110 and 120 that are nearly horizontal within the reservoir 102. On the surface 100, wireline logging truck 120 deploys sensors in well 110, such as magnetic field sensors 140a and 140b, and electric field or voltage sensors 144a and 144b. Similarly, wireline truck 122 is shown deploying sensors 142a, 142b, 146a and 146b in well 112.

According to some embodiments, the electromagnetic measurements are of a single component of the electric and/or magnetic field along the borehole. According to other embodiments, three component measurements are made including the two components that are transverse to the borehole as well as the component parallel to the borehole. Thus, anywhere between one and six components of the electromagnetic field could be measured at a given point in the borehole. It is intended that any orientation or component of the electromagnetic field could be determined in the borehole, from single component measurements. For some specific applications, a certain a combination of measurements may have greater sensitivity than a single component, for example an impedance type measurement which is the ratio of electric to magnetic field component, ellipticity or tilt angle, or total field may have benefits to be less orientation dependent and easier to make than simple vector components of the field.

At the surface 100, surface sensors such as with sensor groups 130a, 130b, 130c and 130d are used to measure up to five components of the electromagnetic field (two horizontal electric fields and all three components of the magnetic field) simultaneously with the fields downhole. According to some embodiments, both the surface and downhole measurements use the same timing-signal to synchronize. For example, the Global Positioning System (GPS) signal could be used for such synchronization. Those skilled in the art could use other ways of extracting measurements that are synchronized.

Figure 2:
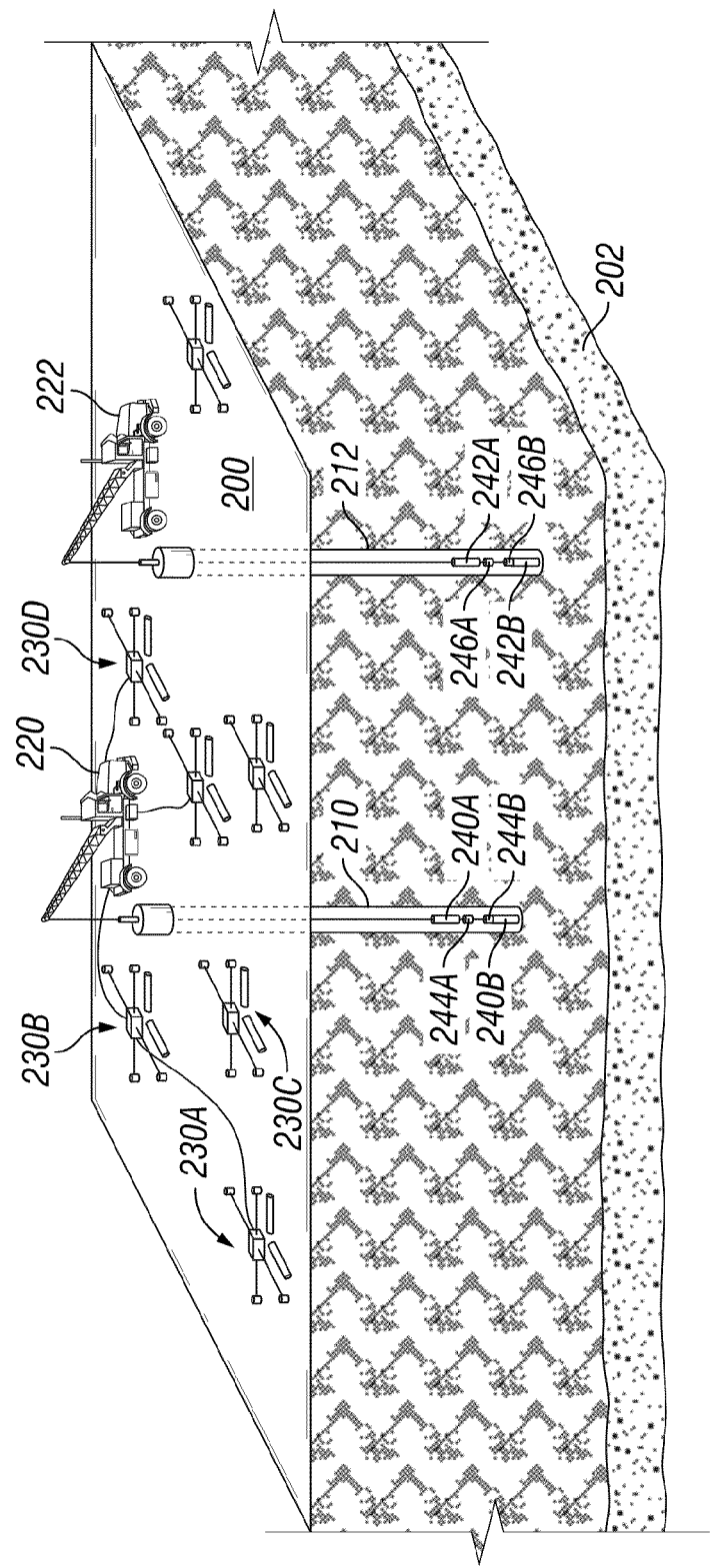
FIG. 2 illustrates a layout for natural field EM measurements made in near-vertical wells within or in proximity to a reservoir as well as on the surface of the earth, according to some embodiments.

FIG. 2 illustrates a layout for natural field EM measurements made in near-vertical wells within or in proximity to a reservoir as well as on the surface of the earth, according to some embodiments. In FIG. 2, electric field and/or magnetic field measurements are made in wells 210 and 220 that are nearly vertical within the reservoir 202. On the surface 200, wireline logging truck 220 deploys sensors in well 210, such as magnetic field sensors 240a and 240b, and electric field or voltage sensors 244a and 244b. Similarly, wireline truck 222 is shown deploying sensors 242a, 242b, 246a and 246b in well 212. At the surface 200, surface sensors such as with sensor groups 230a, 230b, 230c and 230d are used to measure up to five components of the electromagnetic field (two horizontal electric fields and all three components of the magnetic field) simultaneously with the fields downhole.

Although FIG. 1 illustrates nearly horizontal wells and FIG. 2 illustrates nearly vertical wells, those skilled in the art would realize that the described techniques could also be used in wells that are deviated at some extreme angle between horizontal and vertical.

The quantities that are measured are time varying, vertically-propagating, low-frequency naturally occurring electromagnetic fields that are generated by 1) the interaction of the 'solar-wind' with the Earth's magnetic field, and 2) lightening storms in regions far away from the field area. They can also be man made signals generated far from the source area such as those generated by electrical powerlines, low frequency communication systems, electric train signals etc. The measured frequency of these naturally occurring electromagnetic fields are less than 10 kHz and are generally less than 1 kHz. For a further description of these fields, see Vozoff 1991.

According to some embodiments, the magnetic field sensors shown an described with respect to FIGS. 1 and 2 are of one or more types selected from the group consisting of: induction coil, fluxgate magnetometer and superconducting gradiometer, high temperature superconducting magnetometer, Bose condensate magnetometer, hall effect magnetometer, Spin-exchange relaxation-free atomic magnetometer, and proton precession magnetometer.

According to some embodiments, the electric field sensors shown and described with respect to FIGS. 1 and 2 are low noise voltage and or current circuits. For example a low noise electric preamplifier such as described in Webb, S. C., S. C. Constable, C. S. Cox and T. Deaton, *A seafloor electric field instruments*, J. Geomagn. Geoelectr., 37, 1115-1130, 1985, which is incorporated herein by reference.

Figure 3:
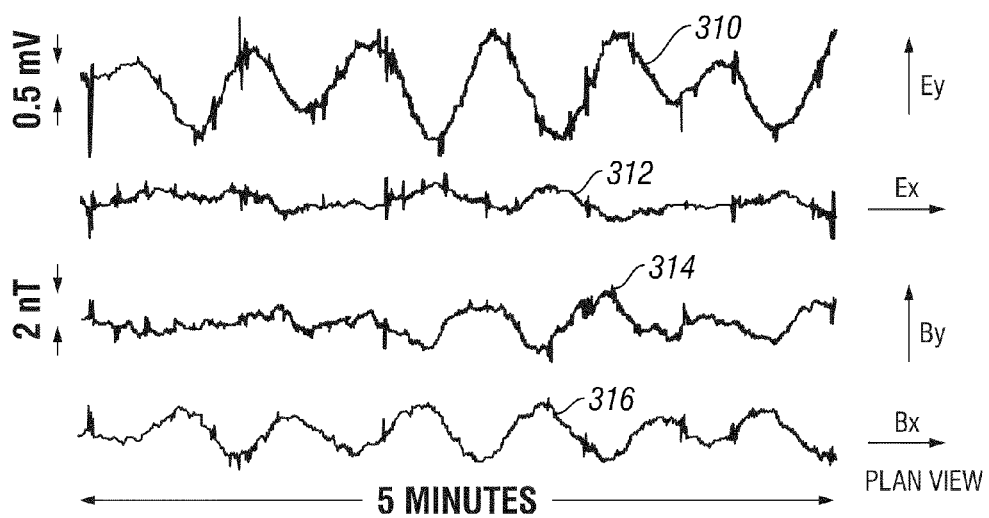
FIG. 3 illustrates an example of four components of the naturally occurring EM fields measured over a period of five minutes.

FIG. 3 illustrates an example of four components of the naturally occurring EM fields measured over a period of five minutes. In particular, curves 310 and 312 plot the electric field in the y-direction and x-direction respectively, and curves 314 and 316 plot the magnetic field in the y-direction and x-direction respectively.

The naturally occurring fields tend to be random in nature, and generally exhibit a power spectrum which below 1 kHz is inversely proportional to the frequency. The exceptions to the latter is the existence of a number of harmonics caused by resonance properties of the Earth-Ionospheric cavity. Note, man made sources located relatively far away from the measurement area can also be used to generate vertically propagating EM fields in the audio and subaudio frequency range (for example, see Zonge, K. L, and Hughes, L. J., 1991, Controlled source audio-frequency magnetotellurics, In Electromagnetic Methods in Applied Geophysics, Volume 2, Application; M. N. Nabighain, Ed., Society of Exploration Geophysicists, which is incorporated herein by reference). These manmade sources that satisfy the requirement of looking like a plane wave illuminate the proposed subsurface conductivity structure. Typically these sources are located 3 or more skin depths away from the receiver positions. Those skilled in the art should realize that sources that create non-vertically-propagating plane waves could also be used, and the same transfer function calculations applied to these types of data. Examples of these types of sources include large transmitter loops either on the ground near the receivers or flown as part of a helicopter or air-plane assembly, and grounded electrical that are in close proximity to the receivers. The latter would generally be stationary on land and towed in a marine environment.

Also shown in FIG. 1, is a processing center 150 which includes one or more central processing units 144 for carrying out the data processing procedures as described herein, as well as other processing. Processing center 150 also includes a storage system 142, communications and input/output modules 140, a user display 146 and a user input system 148. According to some embodiments, processing center 150 can be included in one or both of the logging trucks 120 and 122, or may be located in a location remote from the wellsites.

After the data have been collected as a function of time, they are processed using one of a number of possible techniques to produce estimates of the transfer functions at specific frequencies between various components of the fields. For examples of processing techniques, see Egbert, G. D. and Booker, J. R., 1986, Robust estimation of geomagnetic transfer functions; Geophys. J. R. Astr. Soc., 87, 173-194; Egbert, G. D., 1997, Robust multiple-station magnetotelluric data processing; Geophys. J. Int., 130, 475-496; and Larsen, J. C., Mackie, R. L., Manzella, A., Fiordelisi, A., and Rieven, S., 1996, Robust smooth magnetotelluric transfer functions, Geophys. J. Int., 124, 801-819, each of which is incorporated by reference herein. According to some embodiments a transfer function is computed between orthogonal components of the electric and magnetic fields measured at the same site to yield estimates of the 'Magnetotelluric (MT) Impedance'. A transfer function known as the 'Tipper' can also be estimated, which is the measured vertical magnetic field over the corresponding horizontal magnetic field. Inter-site transfer functions between various components can also be made, according to some embodiments. See, e.g. Slankis, J. A., Telford, W. M., and Becker, A., 1972, 8 Hz telluric and magnetotelluric prospecting; Geophysics, 37, 862-878; and Park, S. K., 1997, Monitoring resistivity change in Parkfield, Calif.: 1988-1995;

J. Geophys. Res., 102, 24545-24559, both of which is incorporated by reference herein. According to some embodiments, the inter-site transfer functions are estimated by calculating transfer function estimates between the borehole measurements and those made at the surface. According to other embodiments, transfer function estimates are also determined between various combinations of borehole measurements. Further examples of transfer functions include the tilt angle or measurement of the polarization angle formed between multiple components, or Latorraca type eigenvectors and eigenvalues of the impedance elements. For example, see Latorraca G A, Madden, T. R., and Korringa, J. 1986, An analysis of the magnetotelluric impedance for three-dimensional conductivity structures. Geophysics, 51:1819-1829, which is incorporated herein by reference. According to some embodiments, the transfer functions are then combined with standard surface measurements and used to interpret the subsurface in terms of 2D or 3D resistivity structure. This interpretation would be done using either forward or inverse modeling.

Although multiple surface sites can be acquired simultaneously as depicted in FIGS. 1 and 2, according to some embodiments, additional improvement in the transfer-function estimates is obtained by placing one or more remotely located stations (that is relatively far away from the survey area) in order to benefit from existing tools which have been developed to suppress noise in surface magnetotelluric methods. An example of these so called 'remote reference' techniques can be found in Egbert, G. D. and Booker, J. R., 1986, Robust estimation of geomagnetic transfer functions; Geophys. J. R. Astr. Soc., 87, 173-194 (incorporated herein by reference) where by the plane wave component within the recorded data is separated out by using principal component analysis techniques.

According to some embodiments, transfer functions are calculated using greater numbers of receivers than a single pair of receivers. When data from more than two receivers are included in the processing, using noise cancellation techniques, such as robust remote reference processing, a more accurate estimate of the transfer function can be obtained. Known statistical software packages can be used to calculate transfer functions using more than two receivers. By using more than two receivers, a coherent signal can be detected between various pairs of receivers, thereby leading to higher quality calculated transfer functions. According to some embodiments, 3-5 receivers are deployed at each location to provide for improved quality.

Figure 4:
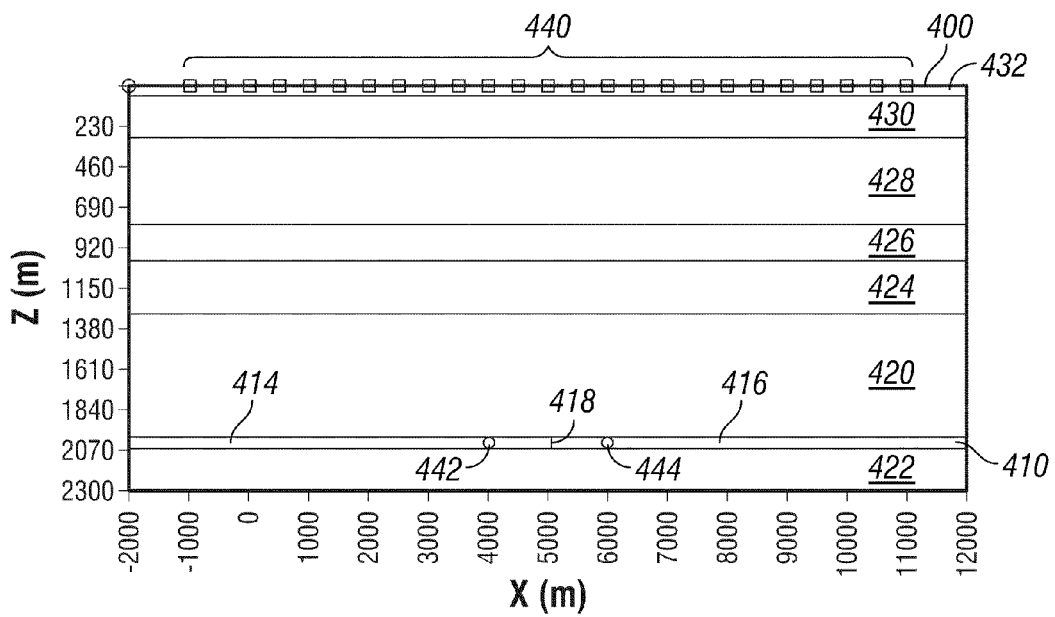
FIG. 4 is a cross sectional view showing the model used in a described modeling study, according to some embodiments.

A modeling study will now be described to further demonstrate aspects of certain embodiments. FIG. 4 is a cross sectional view showing the model used in the described modeling study. The model shown in diagram 410 simulates a reservoir 412 at approximately 2 km depth which is oil saturated on the left side 414, having a conductivity=0.02 S/m, and brine saturated on the right side 416, having a conductivity=1 S/m). The water front 418 in reservoir 412 exists at x=5000 m. Note that the structure is assumed to be two-dimensional and thus is invariant in the direction perpendicular to the page. The regions 420 and 422 directly above and below reservoir 410 respectively have a conductivity of 0.002 S/m. Region 424 has a conductivity of 0.183 S/m. Regions 426 and 430 have a conductivity of 0.02 S/m, region 428 has a conductivity of 0.1044 S/m, and region 432 has a conductivity of 0.05932 S/m. Surface electromagnetic receiver array 440 makes magnetotelluric measurements on surface 400, and receivers are deployed within boreholes 442 and 444 that run horizontally within the oil saturated side 414 and brine saturated side 416, respectively, of the reservoir 410.

The electromagnetic fields are simulated at frequencies ranging from 0.001 Hz up to 100 Hz for two different source polarizations; a transverse electric (TE) polarization in which the electric field is perpendicular to the model-cross-section and the magnetic source field is parallel to the profile, and a transverse magnetic (TM) polarization where the magnetic field is point of this simple demonstration is perpendicular to the model-cross-section and the electric field source field is parallel to the profile. Note that in both of these cases the direction of electromagnetic source-field propagation would be vertical down into the earth.

Figure 5A:
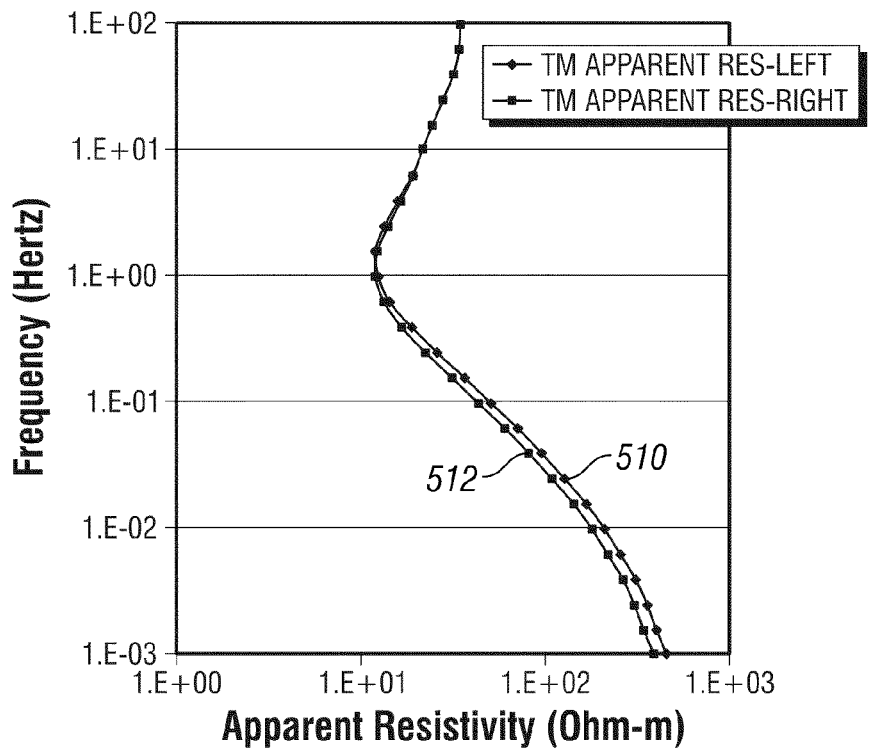
FIGS. 5a-d are plots showing surface magnetotelluric (MT) responses that as would be measured at locations on the surface that are 1000 m laterally on each side of the water front in the model shown in FIG. 4.
Figure 5B:
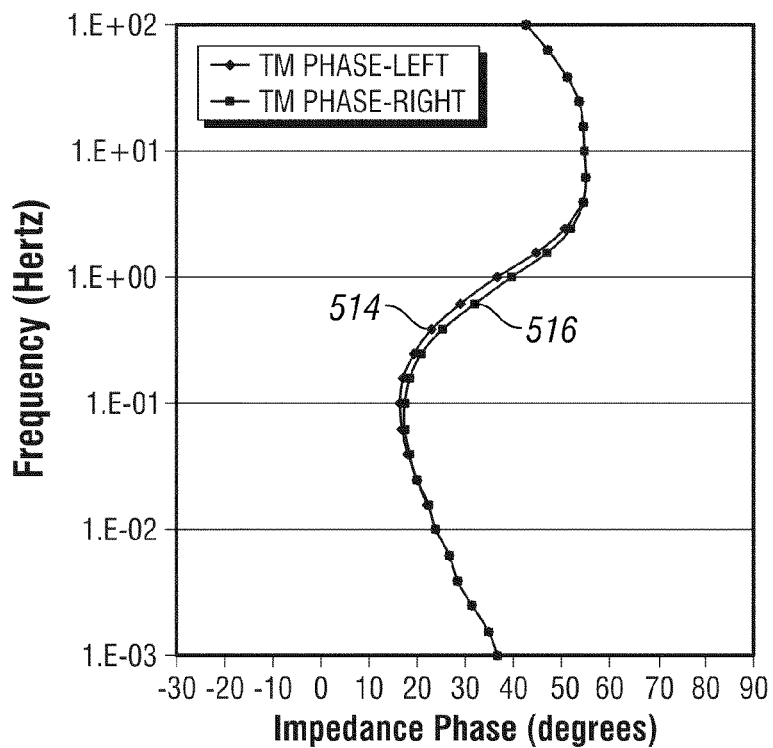
Figure 5C:
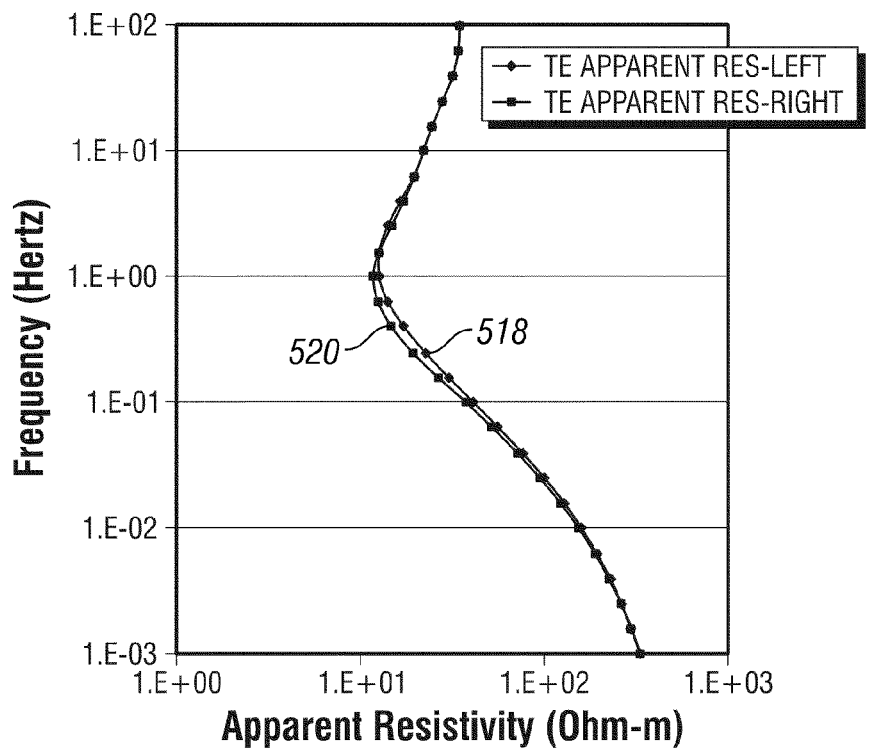
Figure 5D:
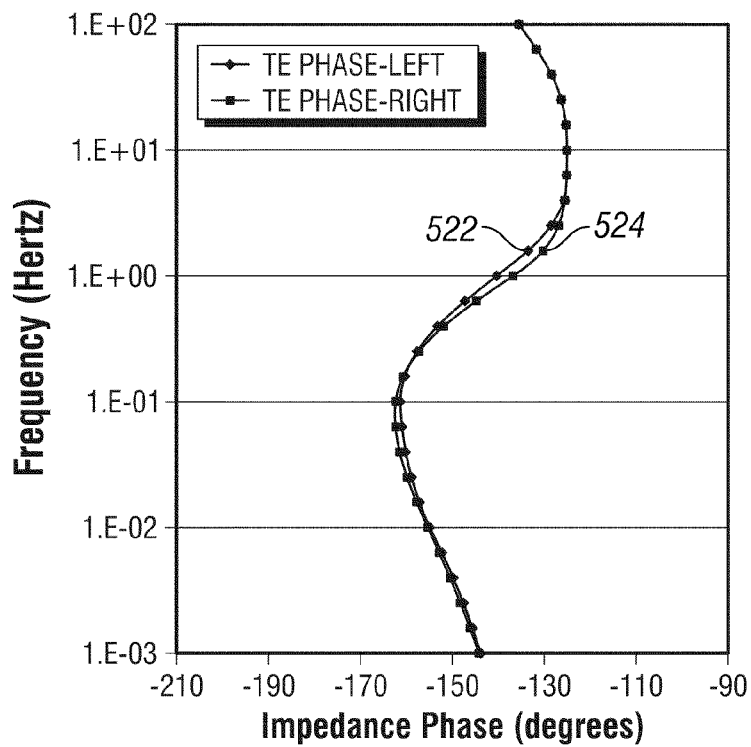

FIGS. 5a-d are plots showing surface magnetotelluric (MT) responses that as would be measured at locations on the surface that are 1000 m laterally on each side of the water front in the model shown in FIG. 4. That is, the two sites are located directly above the two borehole locations depicted in FIG. 4. Here the results are presented in terms of apparent resistivity and phase, which can be derived from the impedance estimates as shown in Vozoff 1991. In FIG. 5a, curves 510 and 512 show the TM mode apparent resistivity for the oil saturated side 414 and brine saturated side 416, respectively, of the reservoir 410. In FIG. 5b, curves 514 and 516 show the TM mode impedance phase for the oil saturated side 414 and brine saturated side 416, respectively. In FIG. 5c, curves 518 and 520 show the TE mode apparent resistivity for the oil saturated side 414 and brine saturated side 416, respectively. In FIG. 5d, curves 522 and 524 show the TE mode impedance phase for the oil saturated side 414 and brine saturated side 416, respectively. The surface magentotellluric apparent resistivity and phase curves were calculated at frequencies between 0.001 Hz and 100 Hz. The x-axis position of the oil saturated side measurements is x=4000 m, and for the brine saturated side measurements it is x=6000 m. It can be seen from FIGS. 5a-d that the MT response to the changing reservoir resistivity is relatively weak at these two surface locations.

Figure 6A:
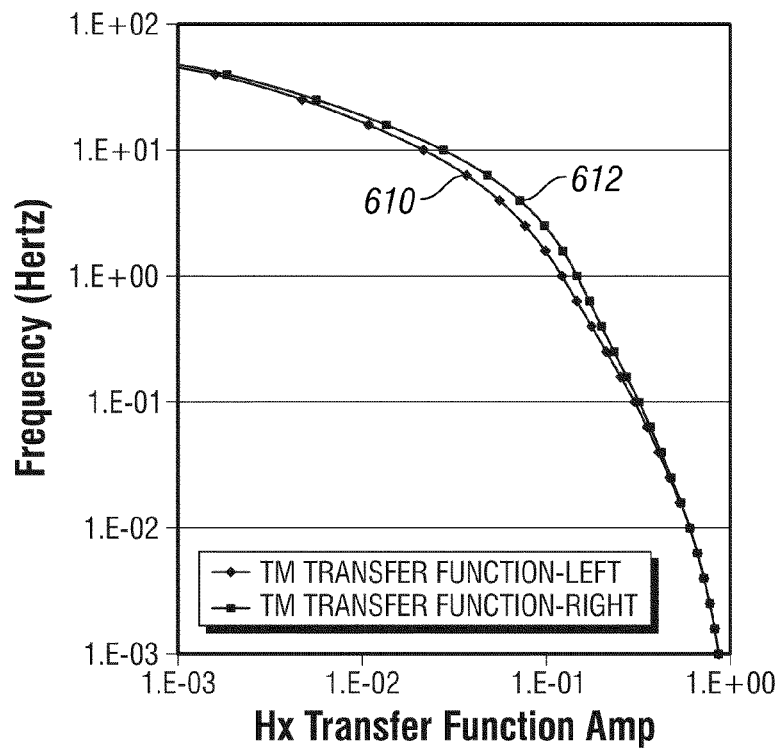
FIGS. 6a-d are plots showing the natural-field borehole-to-surface transfer function amplitudes and phase curves calculated for frequencies between 0.001 Hz and 100 Hz in the example shown in FIG. 4.
Figure 6B:
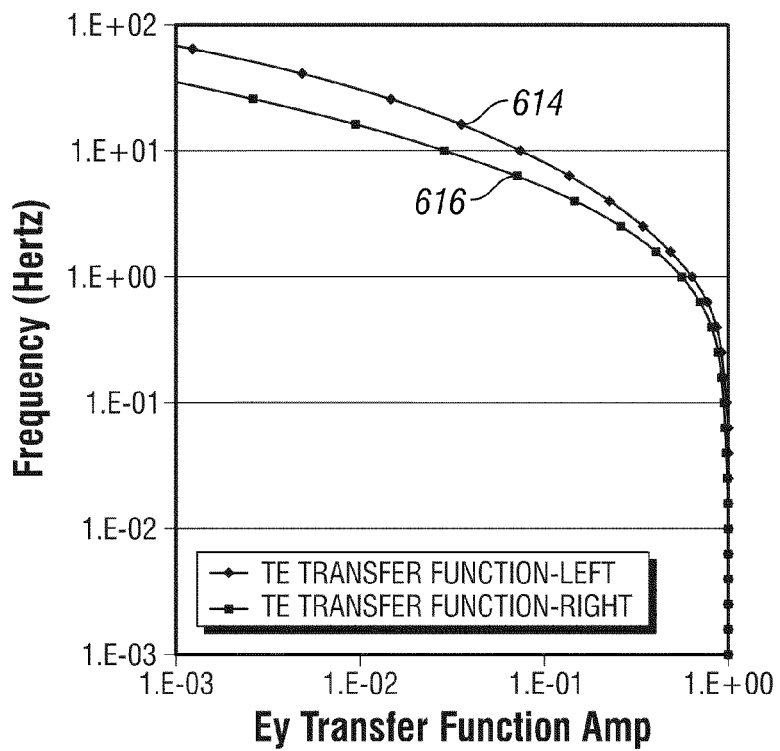
Figure 6C:
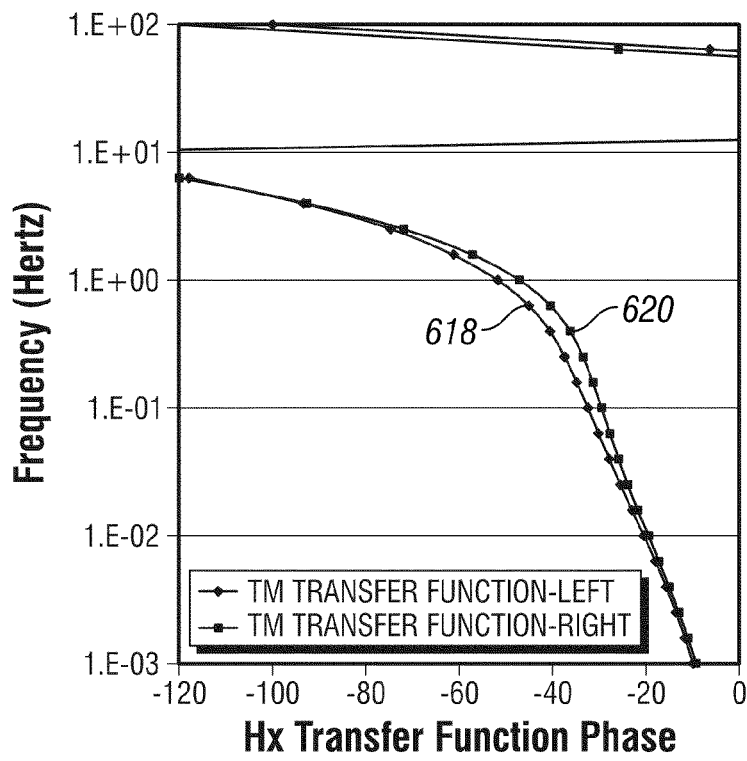
Figure 6D:
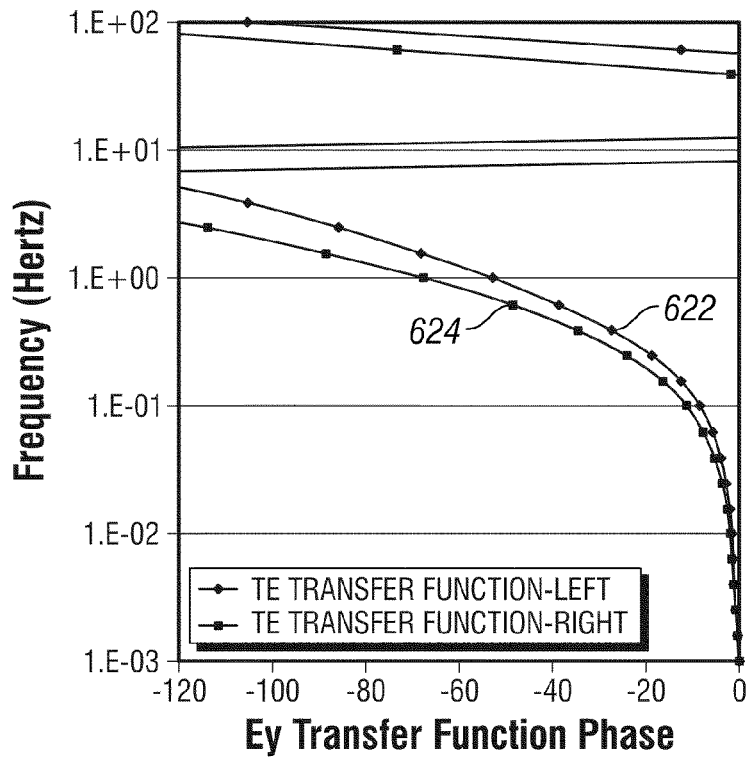

FIGS. 6a-d are plots showing the natural-field borehole-to-surface transfer function amplitudes and phase curves calculated for frequencies between 0.001 Hz and 100 Hz in the example shown in FIG. 4. In FIG. 6a, curves 610 and 612 plot the transfer function amplitudes for TM mode employing simulated measurements of the magnetic field that are perpendicular to the cross-section shown in FIG. 4. In FIG. 6b, curves 614 and 616 plot the transfer function amplitudes for TE mode employing simulated measurements of the electric field perpendicular to plane of FIG. 4. In FIG. 6c, curves 618 and 620 plot the transfer function phases for TM mode employing simulated measurements of the magnetic field that are perpendicular to the cross-section shown in FIG. 4. In FIG. 6d, curves 622 and 624 plot the transfer function phases for TE mode employing simulated measurements of the electric field perpendicular to plane of FIG. 4. The 'left side' curves, namely curves 610, 614, 618 and 622 represent simulated measurement at a position corresponding to x=6000 m in FIG. 4. The 'right side' curves, namely curves 612, 616, 620 and 624 represent simulated measurements at a position corresponding to x=4000 m in FIG. 4. It can be seen from the plots in FIGS. 6a-d that in contrast to FIG. 5a-d, the differences in the borehole-to-surface transfer function between horizontal electric fields for the TE component, and horizontal magnetic fields for the TM component at the two locations is more significant, especially above 1 Hz.

Figure 6E:
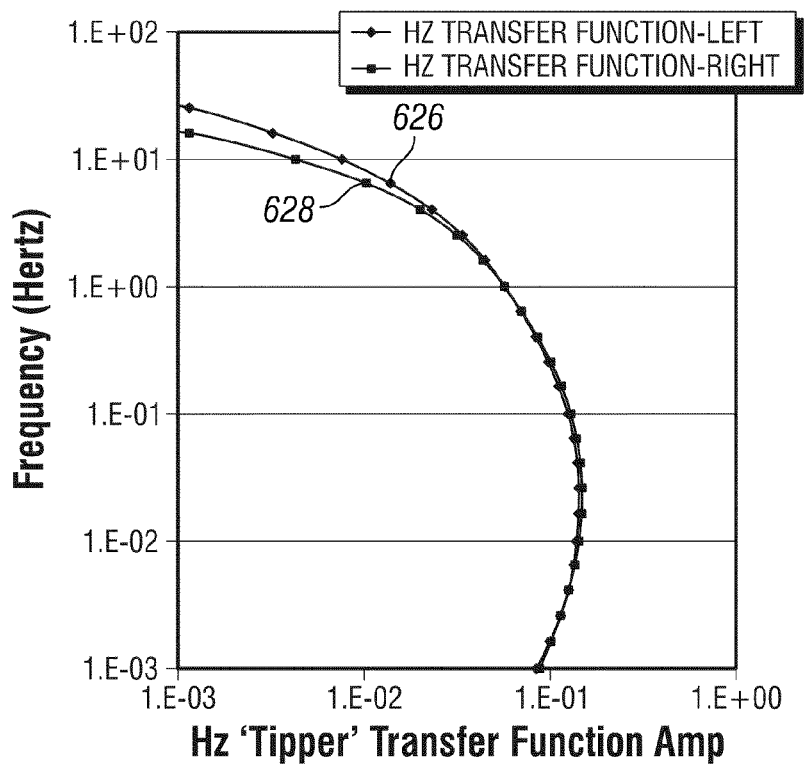
FIGS. 6e-f are plots showing the natural-field borehole-to-surface transfer function amplitudes and phase curves calculated for frequencies between 0.001 Hz and 100 Hz.
Figure 6F:
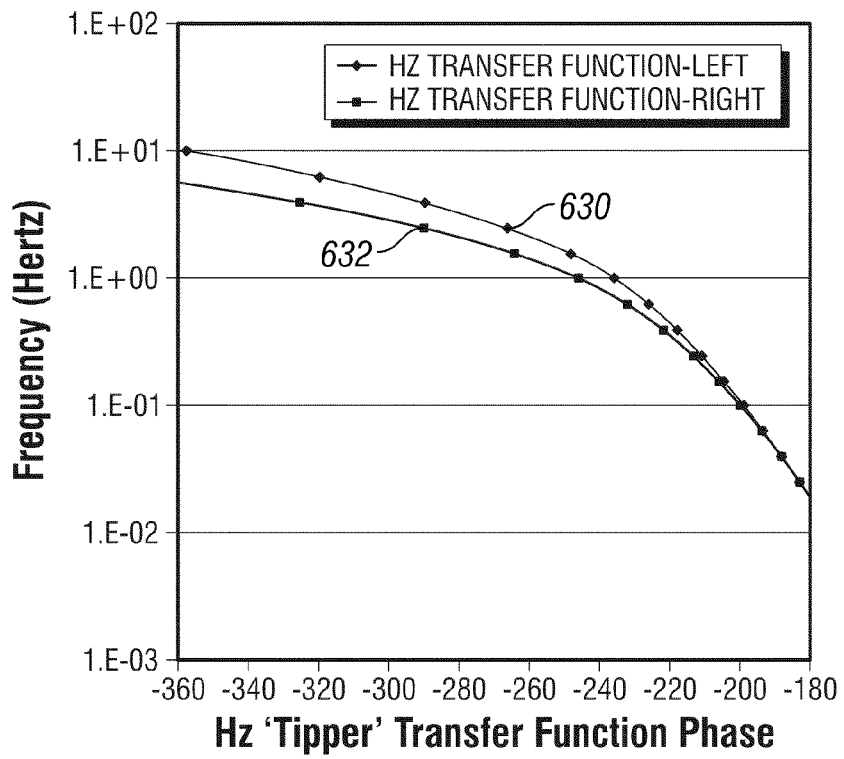

FIGS. 6e-f are plots showing the natural-field borehole-to-surface transfer function amplitudes and phase curves calculated for frequencies between 0.001 Hz and 100 Hz. The transfer-function is calculated between the borehole-measured vertical magnetic field, and the TE mode horizontal magnetic field as measured on the surface. In FIG. 6e, curves 626 and 628 represent the transfer function amplitude for the positions corresponding to x=4000 m and x=6000 m respectively, in FIG. 4. In FIG. 6f, curves 630 and 632 represent the transfer function phase for the positions corresponding to x=4000 m and x=6000 m respectively, in FIG. 4. From FIGS. 6e-f it can be seen that the transfer function between the vertical magnetic field measured in the borehole and the horizontal TE magnetic field measured on the surface also has a significant differences in the response above 1 Hz for the two different measurement positions. Thus, by placing sensors down hole we have improved our sensitivity to the location of the water front.

Figure 7A:
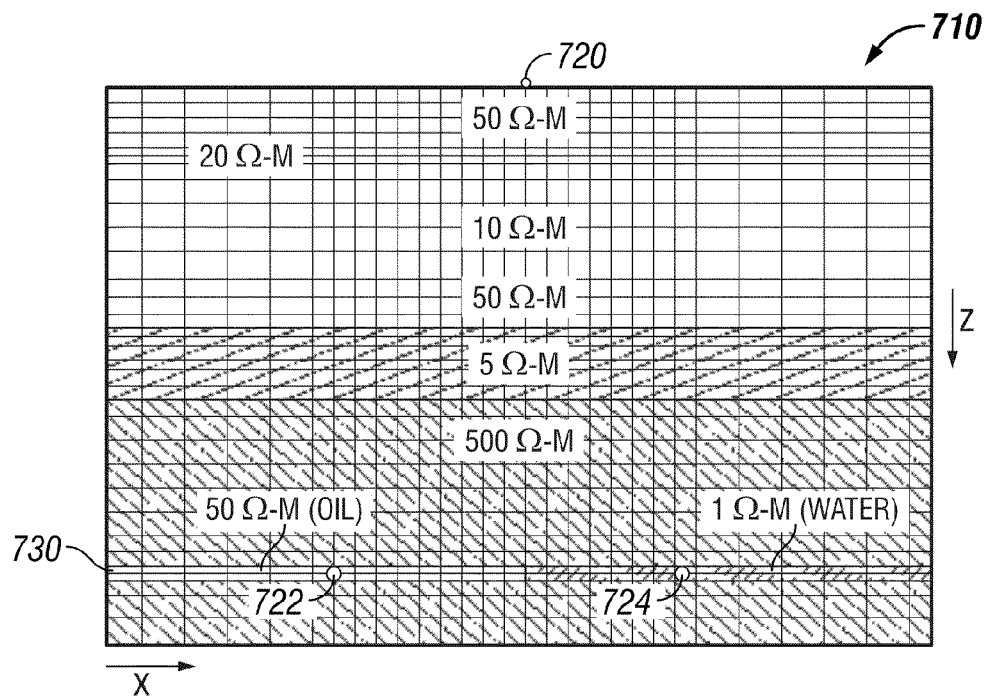
FIGS. 7a-c show aspects of another model used to further demonstrate techniques according to some embodiments.
Figure 7B:
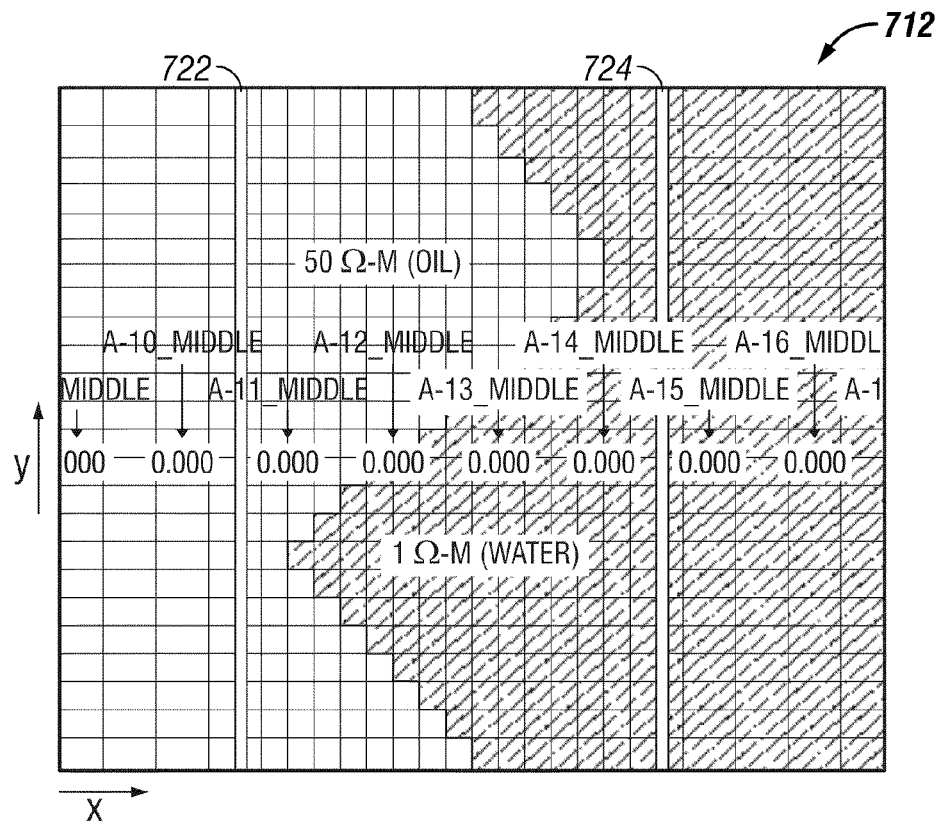
Figure 7C:
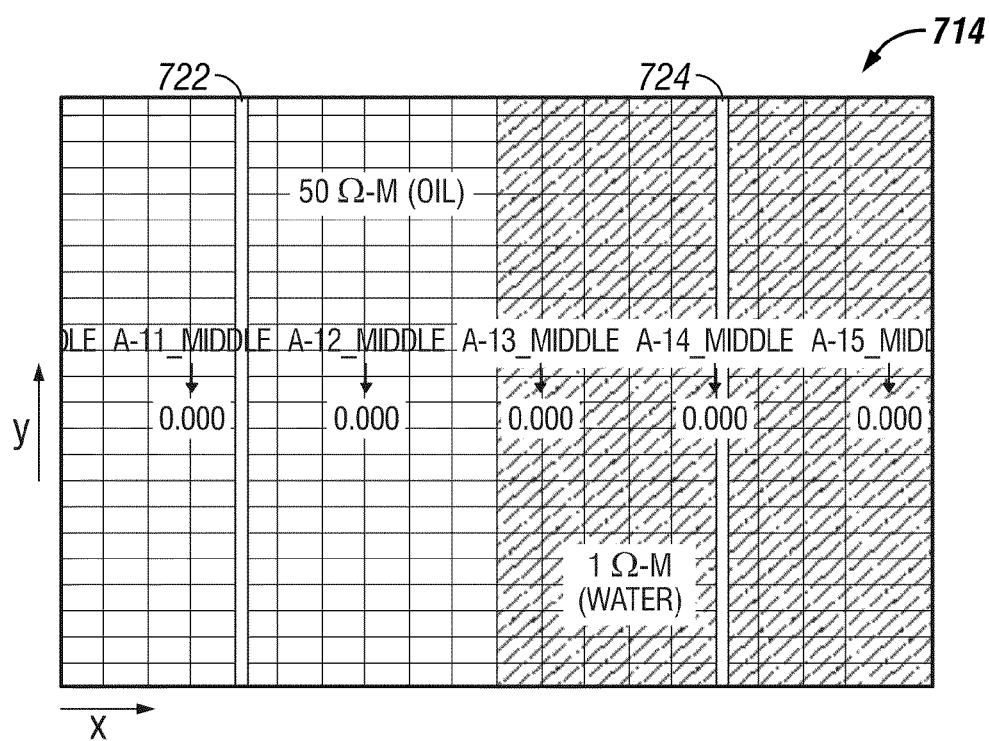

FIGS. 7a-c show aspects of another model used to further demonstrate techniques according to some embodiments. In FIG. 7a, diagram 710 is a vertical cross-section in the x- and z-directions through the center of the model. The surface MT receivers is located at position 720, and two wells 722 and 724 are shown in the oil saturated region and water saturated region of reservoir 730. In FIGS. 7b and 7c, diagrams 712 and 714 are plan view sections at the depth of the reservoir 730 and showing the location of the two wells 722 and 724. FIG. 7b shows an inhomogeneous model where the position of the water front is variable in the x-direction, while FIG. 7c shows a homogeneous model where the water front location is constant in the x-direction.

Figure 8A:
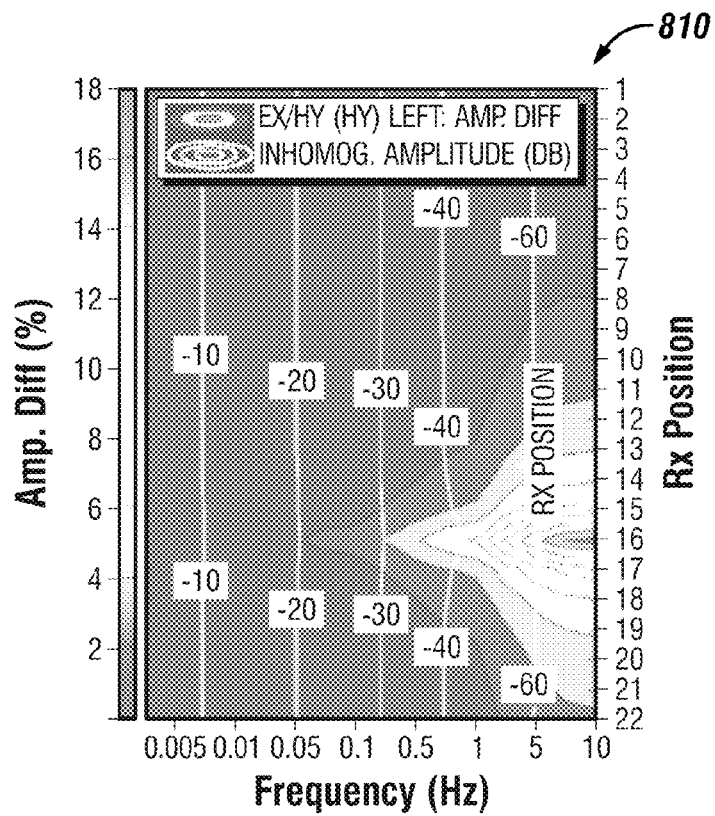
FIGS. 8a-c are plots showing an example of a surface-to-borehole magnetic field transfer functions, according to some embodiments.
Figure 8B:
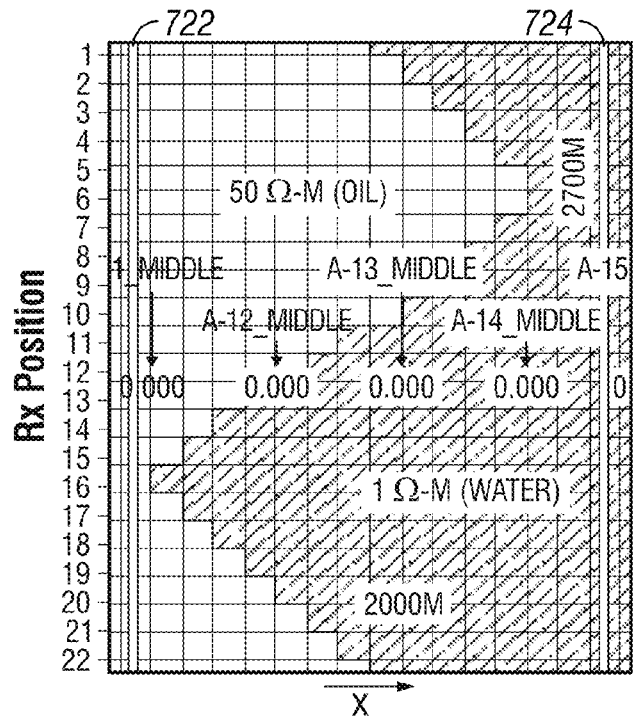
Figure 8C:
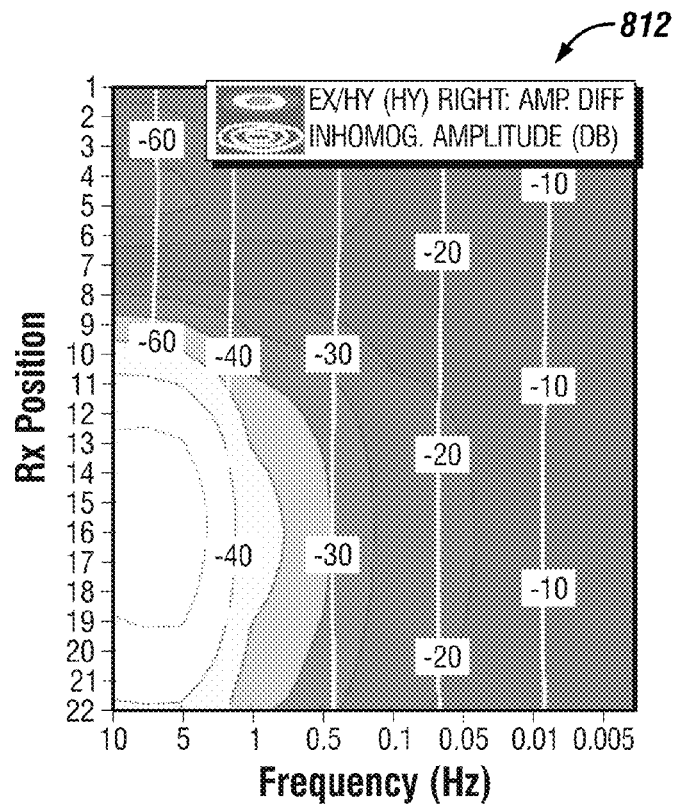

FIGS. 8a-c are plots showing an example of a surface-to-borehole magnetic field transfer functions, according to some embodiments. This particular transfer function shown in FIGS. 8a and 8c is computed by taking the ratio between the magnetic field measured along the borehole direction (in the y direction) and that measured at the surface position 720 in FIG. 7a. In FIGS. 8a and 8c the grey-scale contours represent the difference in transfer function between the homogenous model (shown in FIG. 7c) and the imhomogenous model (shown in FIG. 7b). In FIGS. 8a and 8c the white contours represent the actual transfer function values in dB's. In FIG. 8a, plot 810 represents the transfer function corresponding measurements made in the well 722. In FIG. 8c, plot 812 represents the transfer function corresponding measurements made in the well 724. FIG. 8b, shows positions of the wells 722 an 724 and y-direction positions for the inhomogeneous model. The horizontal axis on plots 810 and 812 of FIGS. 8a and 8c respectively, represents frequency of the calculation.

Figure 9A:
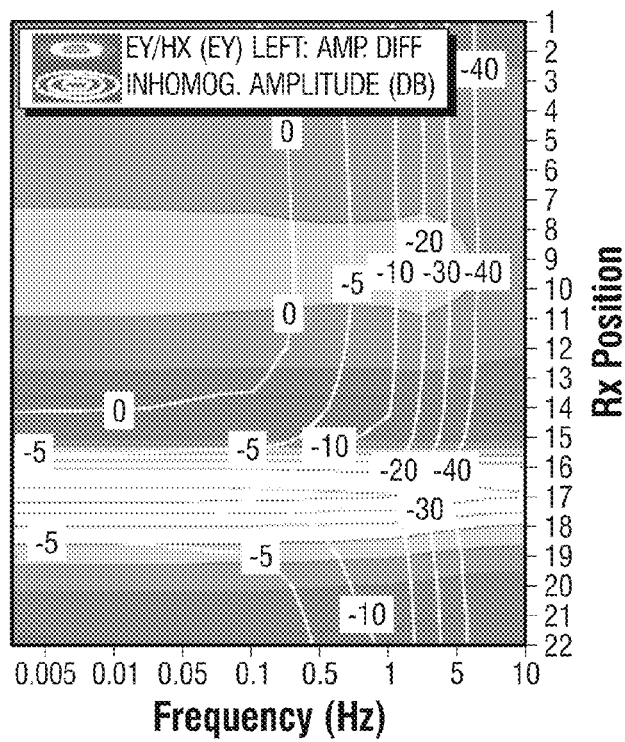
FIGS. 9a-c are plots showing an example of a surface-to-borehole electric field transfer functions, according to some embodiments.
Figure 9B:
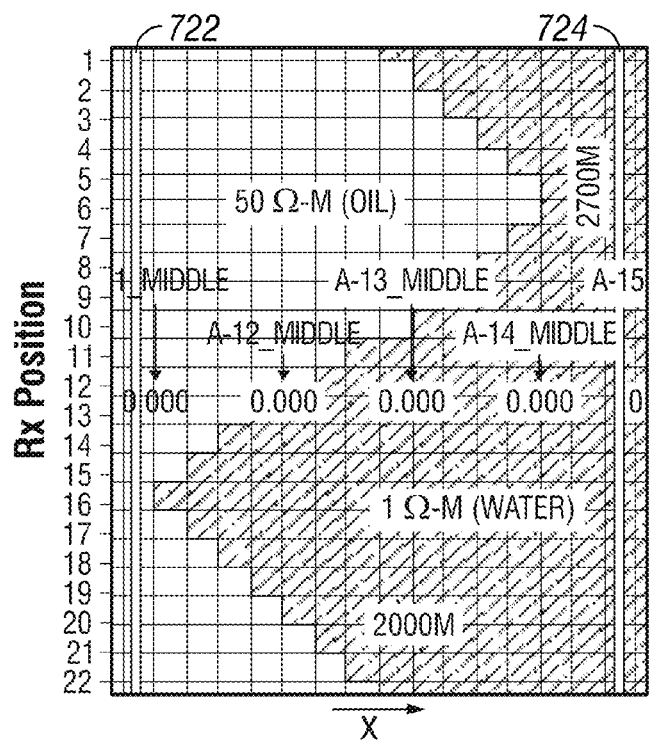
Figure 9C:
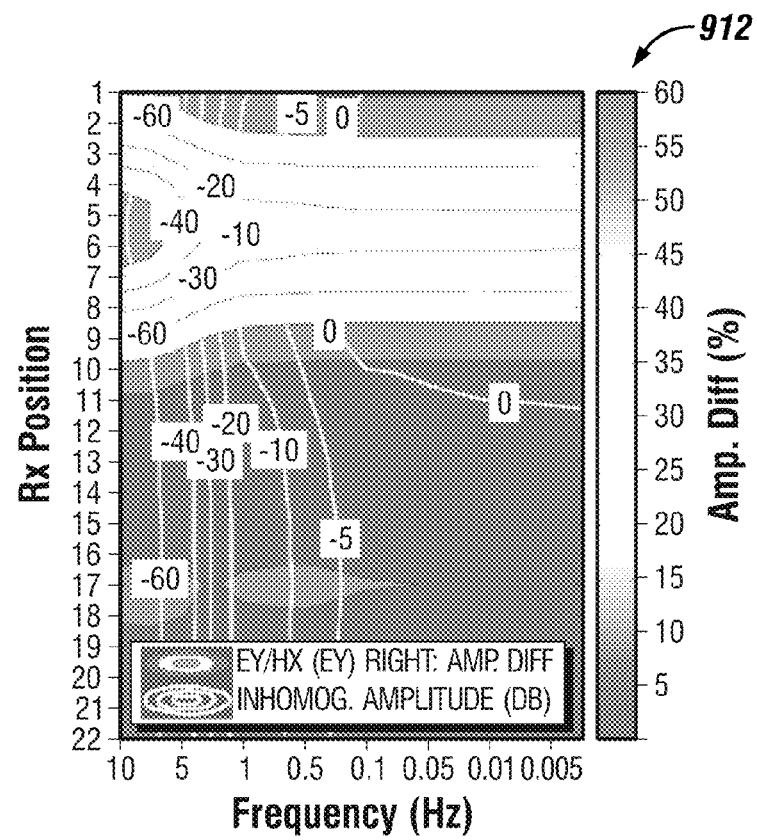

FIGS. 9a-c are plots showing an example of a surface-to-borehole electric field transfer functions, according to some embodiments. This particular transfer function shown in FIGS. 9a and 9c is computed by taking the ratio between the electric field measured along the borehole direction (in the y direction) and that measured at the surface position 720 in FIG. 7a. In FIGS. 9a and 9c, the grey-scale contours represent the difference in transfer function between the homogenous model (shown in FIG. 7c) and the imhomogenous model (shown in FIG. 7b). In FIGS. 9a and 9c, the white contours represent the actual transfer function values in dB's. In FIG. 9a, plot 910 represents the transfer function corresponding measurements made in the well 722. In FIG. 9c, plot 912 represents the transfer function corresponding measurements made in the well 724. FIG. 9b, shows positions of the wells 722 an 724 and y-direction positions for the inhomogeneous model. The horizontal axis on plots 910 and 912 of FIGS. 9a and 9c respectively, represents frequency of the calculation.

Figure 10A:
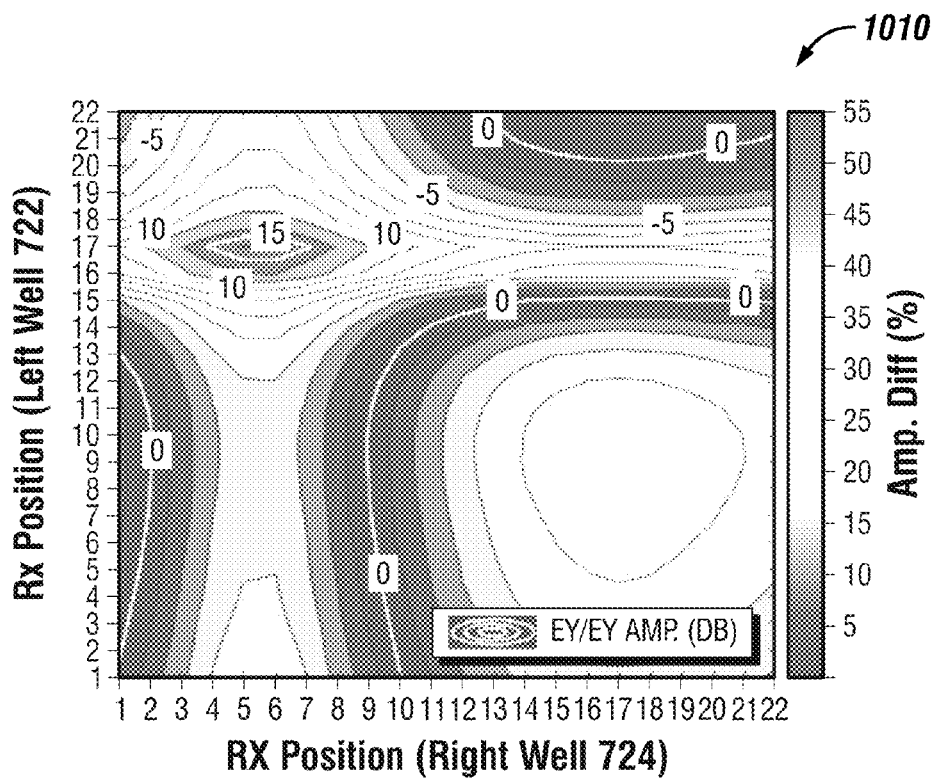
FIGS. 10a-b are plots showing an example of cross-borehole transfer functions at 0.01 Hertz, according to some embodiments.
Figure 10B:
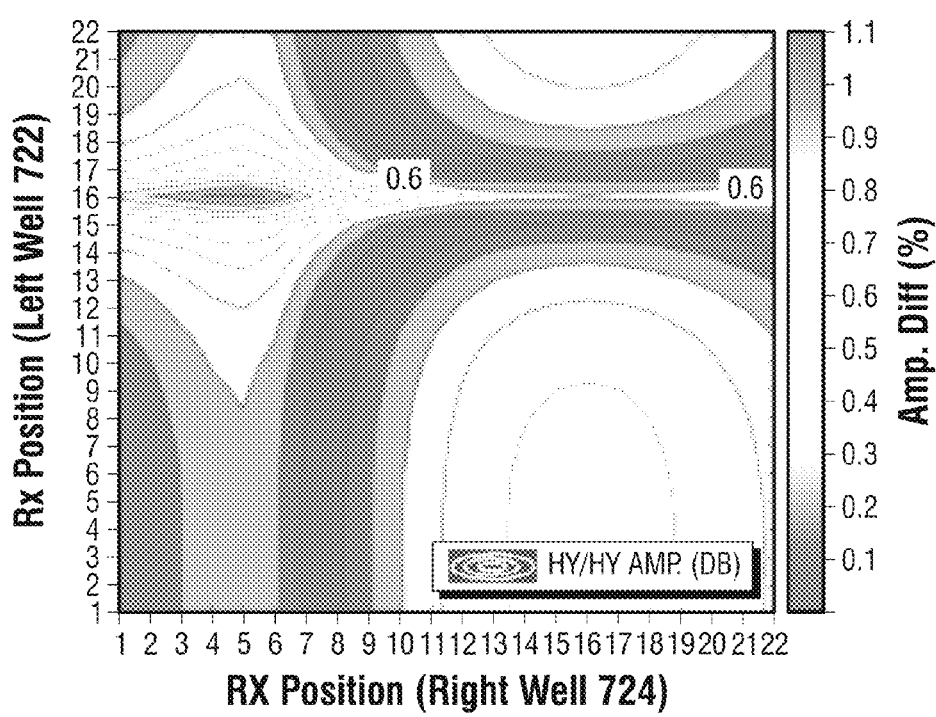

FIGS. 10a-b are plots showing an example of cross-borehole transfer functions at 0.01 Hertz, according to some embodiments. In FIG. 10a, plot 1010 shows the electric-electric transfer function computed by taking the ratio between the electric fields measured in well 722 over the fields measured in well 724 (both shown in FIGS. 7a-c). These are plotted as a function of receiver position in well 722 on the vertical axis and well 724 on the horizontal axis. Similarly, in FIG. 10b, plot 1020 shows the magnetic-magnetic transfer function computed by taking the ratio between the electric fields measured in well 722 over the fields measured in well 724 (both shown in FIGS. 7a-c). These are also plotted as a function of receiver position in well 722 on the vertical axis and well 724 on the horizontal axis. The grey-scale contours in plots 1010 an 1020 represent the difference in transfer function between the homogenous model (shown in FIG. 7c) and the imhomogenous model (shown in FIG. 7b). The white contours represent the actual transfer function values in dB's.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of recording and analyzing survey data of electromagnetic fields originating from at or above the earth's surface, the method comprising:
    receiving first electromagnetic survey data of the electromagnetic fields obtained using a first receiver deployed at a first location in a borehole;
    receiving second electromagnetic survey data of the electromagnetic fields obtained using a second receiver deployed at a second location; and
    estimating a transfer function between the first and second locations for at least portions of the electromagnetic fields based on at least portions of the first and second electromagnetic survey data, the transfer function being estimated based on measurements from two or more pairs of receivers;
    wherein the first electromagnetic survey data is obtained using the first and a third receiver deployed at the first location in the borehole, and the second electromagnetic survey data is obtained using the second and a fourth receiver deployed at the second location.

2. A method according to claim 1 wherein the electromagnetic fields are naturally occurring and originate from above the earth's surface.

3. A method according to claim 1 wherein the electromagnetic fields are man-made though a process unrelated to the method of recording and analyzing survey data.

4. A method according to claim 1 wherein the electromagnetic fields are generated using a source on or above the earth's surface, the source being physically separate from the second receiver.

5. A method according to claim 1 wherein at least portions of the first and second electromagnetic survey data are simultaneously recorded.

6. A method according to claim 1 wherein the transfer function is estimated at one or more predetermined frequencies.

7. A method according to claim 6 wherein the first and second electromagnetic survey data includes electric field components and/or magnetic field components.

8. A method according to claim 7 wherein the first and second electromagnetic survey data includes a plurality of orthogonally measured components.

9. A method according to claim 8 wherein the transfer function is between a component of the first electromagnetic survey data and a component of the second electromagnetic survey data.

10. A method according to claim 1 wherein the first and second electromagnetic survey data is time domain data.

11. A method according to claim 1 wherein the first and second locations are spaced apart by at least 100 meters.

12. A method according to claim 1 wherein the first and second electromagnetic survey data primarily includes frequencies of below 10 kHz.

13. A method according to claim 12 wherein the first and second electromagnetic survey data primarily includes frequencies of below 1 kHz.

14. A method according to claim 1 wherein the second location is downhole in a second borehole.

15. A method according to claim 1 wherein the second location is on the earth's surface.

16. A method according to claim 15 wherein the second location is on a marine sea bed.

17. A method according to claim 1 wherein the first and/or second receiver includes a magnetic field.

18. A method according to claim 1 wherein the first and/or second receiver includes an electric field sensor that measures voltage or current density between two electrodes.

19. A method according to claim 1 further comprising combining the transfer function with data from other measurements thereby generating a model of subsurface resistivity structure.

20. A method according to claim 2 further comprising receiving third electromagnetic survey data of the naturally occurring electromagnetic fields obtained using a third receiver located at a location remote from both the first and second locations.

21. A system for recording and analyzing survey data of electromagnetic fields originating from at or above the earth's surface, the system comprising a processing system adapted and programmed to receive first electromagnetic survey data of the electromagnetic fields obtained using a first pair of receivers deployed at a first location in a borehole and second electromagnetic survey data of the electromagnetic fields obtained using a second pair of receivers deployed at a second location, and to estimate a transfer function between the first and second locations for at least portions of the electromagnetic fields based on at least portions of the first and second electromagnetic survey data, wherein the first electromagnetic survey data is obtained using the first and a third receiver deployed at the first location in the borehole, and the second electromagnetic survey data is obtained using the second and a fourth receiver deployed at the second location.

22. A system according to claim 21 further comprising a downhole deployable tool including the first receiver.

23. A system according to claim 21 wherein the electromagnetic fields are naturally occurring and originate from above the earth's surface.

24. A system according to claim 21 wherein the electromagnetic fields are man-made though a process unrelated to the method of recording and analyzing survey data.

25. A system according to claim 21 wherein the electromagnetic fields are generated using a source on or above the earth's surface, the source being physically separate from the second receiver.

26. A system according to claim 21 wherein at least portions of the first and second electromagnetic survey data are simultaneously recorded, and the transfer function is estimated at one or more predetermined frequencies.

27. A system according to claim 26 wherein the first and second electromagnetic survey data includes electric field components and/or magnetic field components measured at one or more orthogonal directions.

28. A system according to claim 27 wherein the transfer function is between a component of the first electromagnetic survey data and a component of the second electromagnetic survey data.

29. A system according to claim 21 wherein the first and second location are spaced apart by at least 100 meters.

30. A system according to claim 21 wherein the first and second electromagnetic survey data primarily includes frequencies of below 10 kHz.

31. A system according to claim 20 further comprising a second downhole deployable tool including the second receiver.

32. A system according to claim 21 wherein the second location is on the earth's surface.

33. A system according to claim 22 wherein the first receiver includes a magnetic field sensor using one or more sensor types selected from the group consisting of: induction coil, fluxgate magnetometer, superconducting gradiometer, high temperature superconducting magnetometer, Bose condensate magnetometer, hall effect magnetometer, spin-exchange relaxation-free atomic magnetometer, and proton precession magnetometer.

34. A system according to claim 21 wherein the first and/or second receiver includes an electric field sensor that measures voltage or current density between two electrodes.

35. A system according to claim 21 wherein the transfer function is estimated based on measurements from two or more pairs of receivers.

* * * * *